INVENTOR.
ROBERT A. PENDLETON

BY Fred Jacob
ATTORNEY.

July 2, 1968 R. A. PENDLETON 3,391,399

MAGNETIC TAPE PNEUMATIC CAPSTAN DRIVE WITH MOVABLE PNEUMATIC BRAKE

Filed May 20, 1964 2 Sheets-Sheet 2

INVENTOR.
ROBERT A. PENDLETON

BY Fred Jacob

ATTORNEY.

United States Patent Office 3,391,399

Patented July 2, 1968

3,391,399

MAGNETIC TAPE PNEUMATIC CAPSTAN DRIVE WITH MOVABLE PNEUMATIC BRAKE

Robert A. Pendleton, Dedham, Mass., assignor to Honeywell Inc., Minneapolis, Minn., a corporation of Delaware Filed May 20, 1964, Ser. No. 368,792
7 Claims. (Cl. 340—174.1)

ABSTRACT OF THE DISCLOSURE

This invention pertains to a pneumatic magnetic tape drive and brake. The pneumatic brake is positioned opposite the head and is movable relative thereto in order to provide access for inspection and servicing. Means are provided to indicate the withdrawn position of the brake. An erase head may be incorporated in the brake surface.

The present invention relates in general to new and improved tape transports, in particular to magnetic tape transports which readily permit the separation of the magnetic head and the magnetic tape from each other for the purpose of cleaning, maintenance, initial tape threading and removal and rapid rewind.

The most advanced tape transports presently available employ a vacuum (or air pressure) to carry out most of the strictly mechanical functions required during their operation. Thus, it is known to apply a vacuum to one or the other of a pair of counter-rotating tape drive capstans to move the tape in the desired direction. Similarly, a vacuum may be selectively applied to a brake stationed adacent the magnetic head to arrest the tape motion by sucking the tape against the stationary brake surface. The vacuum may also be employed to hold the tape reels in place and to withdraw the magnetic head from contact with the tape. Such vacuum control affords an effective and rapid method of operating a tape transport.

An effective technique for selectively arresting tape motion employs a pair of spaced brake surfaces symmetrically positioned with respect to the magnetic head so that the tape travels between the latter and these surfaces. In order to keep problems of tape flutter, guidance, skewing and elasticity to a minimum, the spacing of the brake surfaces from the magnetic head must be small. The head may extend between and below the brake surfaces in order to enhance the recording and readout characteristics of the tape drive by bringing the tape into more intimate contact with the head. Ready access must, however, be provided for initially threading the tape between the magnetic head and the brake for tape removal, as well as for servicing and cleaning both the tape and the magnetic head surface presented to the latter. Additionally, tape rewinding, which occurs at high speeds, is preferably carried on out of contact with the magnetic head to preserve the surfaces of both.

It is of course well known to use a movable pressure pad opposite the magnetic head for selectively pressing the tape against the latter in order to arrest the tape motion. The disadvantages of this technique are obvious, wear due to friction of the magnetic head, as well as of the tape and of pressure pad, being the primary ones. Moreover, such a technique is not susceptible of rapidly arresting tape motion and accordingly its use is limited to apparatus such as tape recorders and the like, wherein lower performance standards are acceptable.

High performance magnetic tape transports which operate in conjunction with computer systems, may call for tape travel at speeds upward of 80 inches per second, and thus require a different approach to the problem of starting and stopping the tape. The question of access to the magnetic head and to the tape must be considered with this requirement in mind. In presently available magnetic tape transports, particularly those where vacuum actuation is employed, the brake remains fixed in position on one side of the magnetic tape and the magnetic head may be selectively withdrawn from contact with the other side of the tape. This is carried out by rotating the head out of contact with the tape to a position where the normally contacting head becomes accessible for servicing. The magnetic tape portion which was under the head then similarly becomes accessible for cleaning and inspection. In this position of the head the tape may also be conveniently removed or loaded and rapid tape rewind may be carried on.

While the above-described technique presents a number of important advantages, it is relatively expensive to implement. The reason therefor lies primarily in the close tolerances required for accurately re-positioning a multi-core head on a multi-channel tape after the head has been moved out of contact with the tape. Since the respective tape channels may have a width of the order of 35 mils, with 70 mils on the centers, virtually no latitude for error exists since any displacement of the head relative to the respective tape channels transverse to the direction of tape motion will produce cross-talk between the channels. The positioning of the head must also be accurate in the direction of tape motion in order to re-establish the same relationship of the head with respect to the oppositely stationed brake which determines the tape path in the vicinity of the head.

Accordingly, it is the primary obect of the present invention to provide a tape transport which overcomes the foregoing disadvantages.

It is another object of the present invention to provide a tape transport wherein the magnetic head remains fixed and a vacuum-controlled brake, which is normally interposed in the tape path, is selectively withdrawn to provide the necessary clearance between the tape and the magnetic head.

It is a further object of the present invention to provide a low-cost magnetic tape transport wherein a movable brake is positioned opposite a fixed magnetic head to provide more intimate contact between a fixed magnetic head to provide more intimate contact between the latter and the interposed magnetic tape and wherein separation between the magnetic head and the tape is obtained by withdrawing the brake with respect to the head.

The various novel features which characterize the invention are pointed out with particularity in the claims annexed to and forming a part of this specification. For a better understanding of the invention, its advantages and specific objects thereof, reference should be had to the following detailed description and the accompanying drawings in which:

Figure 1:
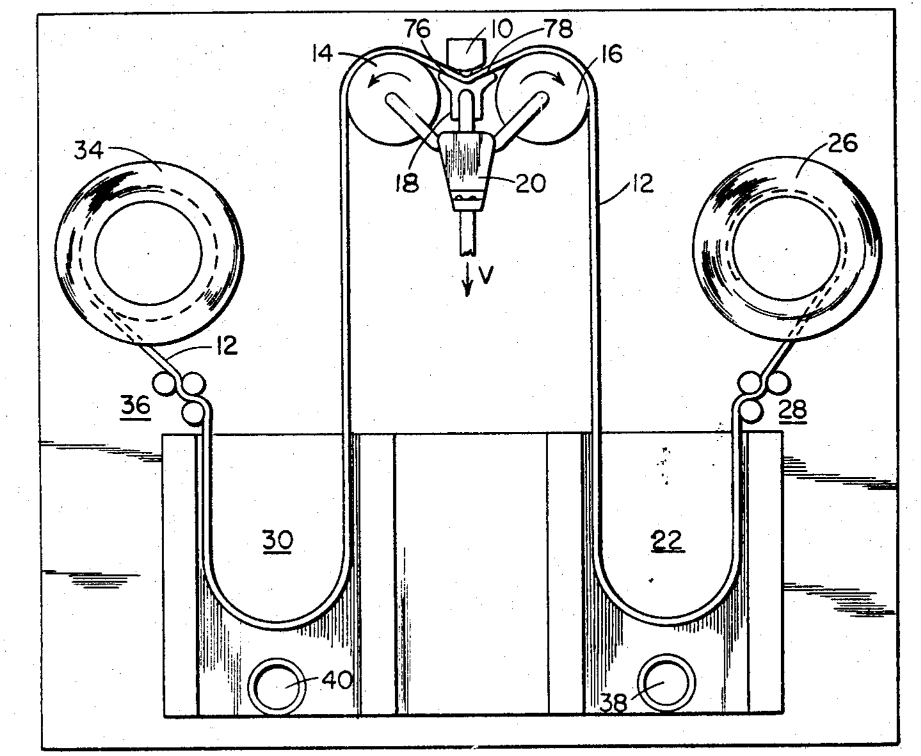
FIGURE 1 illustrates the general configuration of a vacuum-controlled magnetic tape transport.

With reference now to the drawings, the general layout of a vacuum-controlled magnetic tape transport is illustrated in FIGURE 1. In the operative position, the magnetic head 10 is in contact with the magnetic tape 12 which is moved between the counter-rotating drive capstans 14 and 16 in contact with the brake surfaces 76 and 78 of a vacuum brake 18. The capstans 14 and 16, as well as the brake 18, are seen to communicate with a pneumatic valve 20 to which a vacuum V is selectively applied. Both capstans and the surfaces of the vacuum brake 18 in contact with the tape 12, may contain a plurality of slots through which suction is applied to the tape.

If it is desired to drive the magnetic tape to the right, the valve 20, which may be electromagnetically controlled, will apply a vacuum to the capstan 16 and not to the capstan 14 or the brake 18. The suction thus applied to the tape 12 through the slots in the surface of the capstan 16 will hold the tape against the latter to impart the capstan motion thereto. Reverse tape motion is achieved by applying a vacuum to the capstan 14 only. If tape motion is to be arrested, a vacuum is applied only to the brake 18. The suction thus applied to the tape through the contacting brake surfaces 76 and 78, the stationary brake 18 will hold the tape against the latter to arrest its motion.

The tape passes from a reel 34 into a loop chamber 30, by way of a set of guide pins 36. From there, it passes to the capstan 14 and thence between the magnetic head 10 and the brake 18 to the capstan 16. From the capstan 16, the tape passes into a loop chamber 22 and from there to a reel 26 by way of a set of guide pins 28. A vacuum is applied to the loop chambers 22 and 30 through the openings 38 and 40 respectively, which serves to keep the tape under tension.

The magnetic head 10 may be of the type wherein a separate read/write core corresponds to each tape channel and a single erase core has a gap which spans the width of the tape, as disclosed in a patent of Kyriacos Joannou, No. 3,105,965, which is assigned to the assignee of the present invention. Alternatively, the well known read-after-write head may be employed wherein one write core and one read core correspond to each channel. As previously explained, access must be provided to the surface of the magnetic head 10 which is presented to the tape 12, as well as to the latter, for cleaning and maintenance purposes. Access is also required for initially threading the tape between the head and the brake and for removing it. Moreover, rapid rewind of the tape preferably occurs out of contact with the magnetic head 10 to save wear on the latter as well as on the tape.

As illustrated in FIGURE 2 wherein applicable reference numerals have been retained, this is accomplished in the present invention by providing a brake 42 which is movable relative to the fixed head 10 and which confronts the arcuate surface 11 of the latter. The brake 42 includes a pair of elongated slots 44 and 46 which are slidably engaged by a pair of pins 48 and 50 respectively, the pins being anchored to a supporting structure 52. The brake 42 further includes a pair of bores 54 and 56 that are slidably engaged by a pair of pins 58 and 60 respectively, the latter pins being anchored in a shoulder 62 of the supporting structure 52. The brake 42 is thus adapted to move upward and downward relative to the fixed magnetic head 10, in a precisely determined path, its extreme positions being defined by the elongated pair of slots 44 and 46 and the cooperating pins 48 and 50.

A pair of compression springs 64 and 66 encircle the aforesaid pins 58 and 60 respectively in the space between the shoulder 62 and the brake 42 so as to urge the latter into contact with the fixed magnetic head 10. A disc 68 is eccentrically affixed to a pivot shaft 70, the latter being rotatably held by the supporting structure 52. The disc itself is slidably disposed in a slot 72 of the brake 42, said slot being symmetrically positioned with respect to the slots 44 and 46 and being elongated in a direction substantially parallel to the direction of tape travel. A hand knob 74 is attached to the disc 68 and is adapted to turn the latter about its eccentric pivot 70.

The brake 42 further includes a pair of contoured surfaces 76 and 78 which are spaced from each other centrally of the arcuate surface 11 of the magnetic head 10, each having a width at least equal to that of the tape and preferably extending beyond the latter. Each of the contoured brake surfaces 76 and 78 contains a plurality of suction slots 80 and 82 which communicate with a pair of openings 84 and 86 respectively, through which a vacuum is selectively applied. A limit switch 88 is located below the brake 42 and is adapted to be actuated in the extreme downward position of the latter so as to provide a responsive output signal S.

Figure 2A:
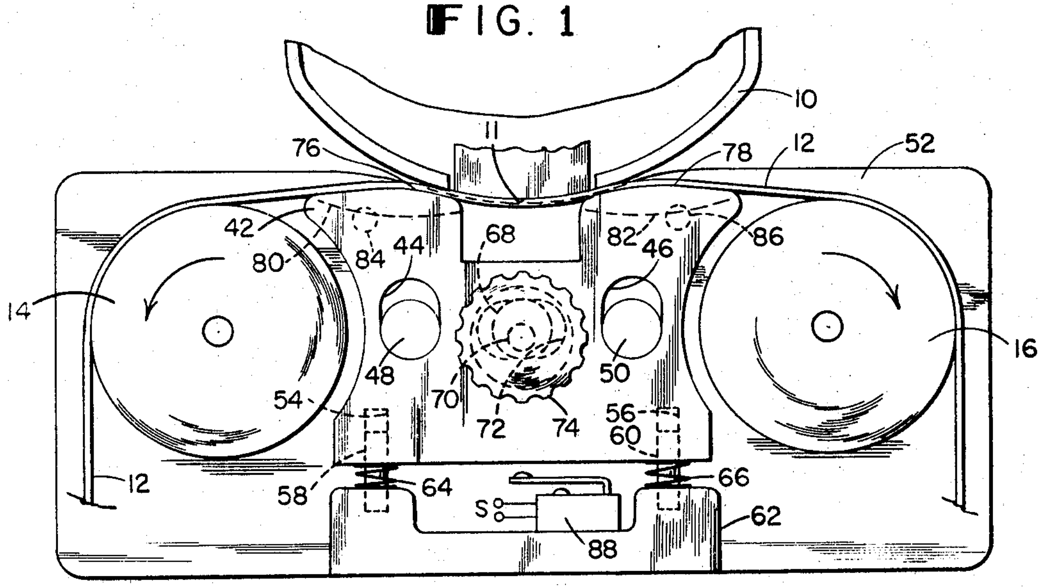
FIGURES 2A and 2B illustrate a preferred embodiment of the present invention.

FIGURE 2*a* illustrates the extreme upward position of the brake 42. A portion of the arcuate head surface 11 is seen to extend between the spaced contoured brake surfaces 76 and 78 so that the intermediately positioned tape 12 is wrapped around the head surface 11. By thus bringing the tape into more intimate contact with the magnetic head, the recording and readout properties of the tape transport are materially enhanced. The operating position shown in FIGURE 2*a* is set by the hand knob 74 and the associated eccentrically pivoted disc 68. This position is maintained by the compression springs 64 and 66 which urge the brake into contact with the fixed head 10 to the extent permitted by the slots 44, 46 and the associated pins 48, 50.

Figure 2B:
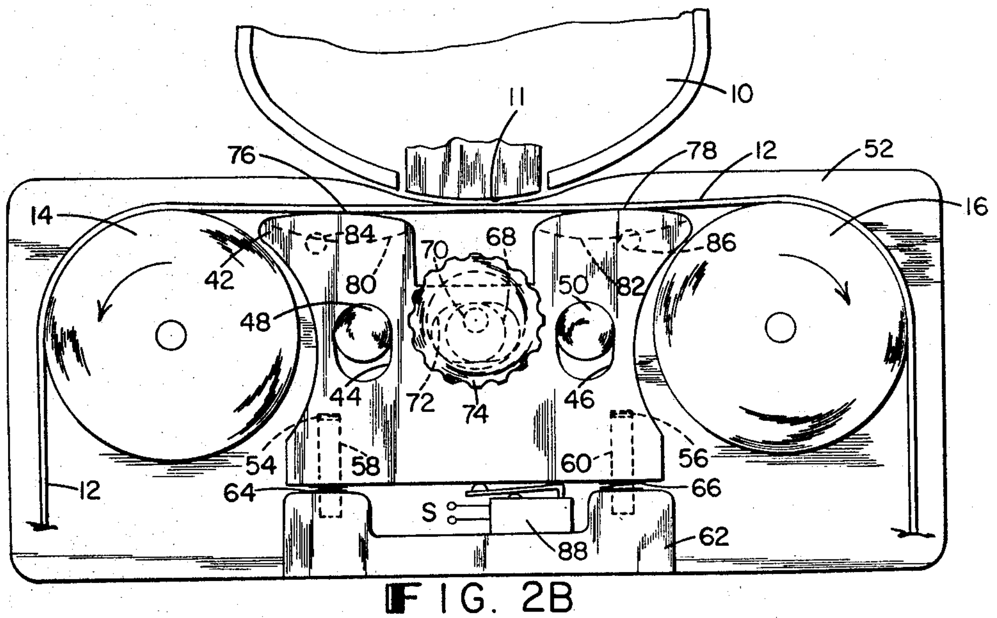

When access to the magnetic head surface 11 or to the tape 12 is required, or if the tape and the magnetic head must be separated for initial threading, for tape removal, or for rapid tape rewind, the hand knob 74 is twisted 180 degree until the disc 68 assumes the position shown in FIGURE 2*b* relative to its eccentric pivot 70. The disc 68 causes the brake 42 to move down against the force of the compression springs 64 and 66. The extreme downward position is determined by the elongated slots 44 and 46 and the mating pins 48 and 50 respectively. Simultaneously, the bores 54 and 56 slide down on the mating pins 58 and 60 respectively which supply additional stability to the brake 42.

The movement of the brake, which may total of the order of ⅛ inch, has the effect of removing the spaced contoured brake surfaces 76 and 78 from their encircling relationship relative to the magnetic head surface 11 and to remove the tape 12 from contact with the latter surface. The bottom surface of the brake 42 now bears against the arm of the microswitch 88. The latter is actuated to provide an output signal S indicative of the downward position of the brake 42 and out of contact with the fixed magnetic head 10. In this position all cleaning and maintenance functions may be carried out with respect to the contacting surfaces. Tape threading and removal, as well as rapid tape rewinding, are also carried out in this position of the brake.

Figure 3:
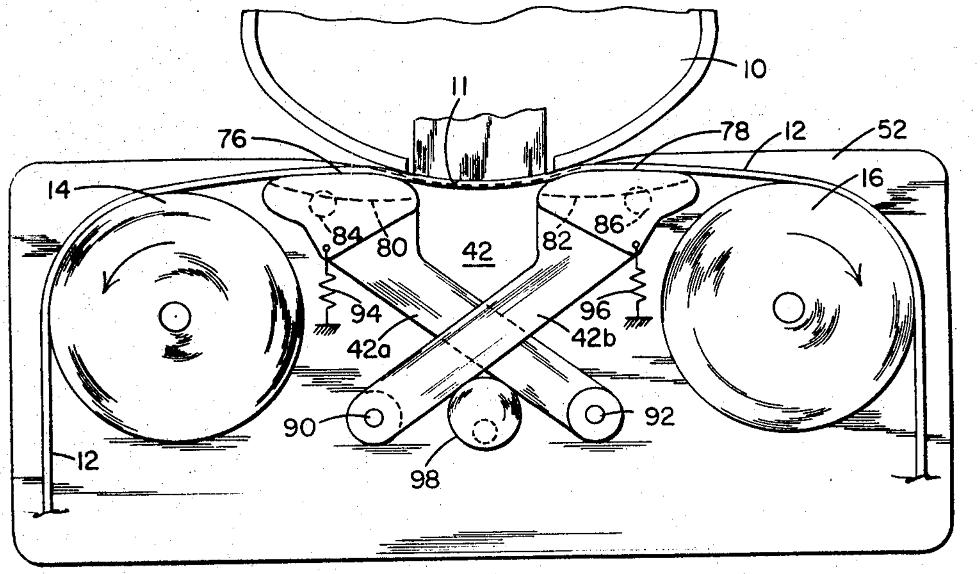
FIGURE 3 illustrates another embodiment of the present invention.

FIGURE 3 illustrates another embodiment of the present invention, applicable reference numerals having been retained. As shown in the drawing, the brake 42 is positioned between the counter-rotating drive capstans 14 and 16. The brake consists of a pair of elongated components **42*a* and 42*b* each pivoted at one end thereof, at points 90 and 92 respectively. The other end of each brake component terminates in the aforesaid contoured brake surface, to wit the surfaces 76 and 78 respectively. Each of the aforesaid surfaces includes a plurality of suction slots 80 and 82 respectively, which communicate with a vacuum through the openings 84 and 86** respectively. The brake components are positioned in crossed-over relationship with respect to each other. As before, the width of each contoured brake surface is at least equal to that of the tape, both surfaces being aligned in the direction of tape travel.

As shown in FIGURE 3, a pair of tension springs 94 and 96, which are anchored to the supporting structure 52, urge the brake components **42*a* and 42*b* downward so as to withdraw the contoured brake surfaces 76 and 78 from contact with the magnetic head surface 11. An upward force is selectively applied at the point of cross-over of the two brake components, to urge the brake surfaces 76 and 78 into contact with the magnetic head surface 11 against the force of the tension springs 94 and 96. This action causes the intermediately positioned tape 12 to be wrapped around a portion of the surface 11**.

As in the case of the apparatus of FIGURE 2, the upward force may be applied by means of an eccentrically pivoted disc 98 of sufficient thickness to contact both of the superposed brake components 42*a* and 42*b*. As shown in the drawing, the force applied by the disc opposes the force applied by the springs. When the disc 98 is turned to move in a downward direction, the tension springs 94 and 95 will cause the brake components 42*a* and 42*b* to follow so as to withdraw the tape 12 from contact with the magnetic head surface 11 and to provide the desired access.

Where the head 10 is a read-after-write head having a pair of cores corresponding to each tape channel, as discussed above, it may nevertheless be desirable to provide a separate erase core with a gap that spans the entire width. The presence of such a core will enhance the reliability of erasing recorded tape data where excessive tape skewing is encountered. To this end, one of the brake components shown in FIGURE 3, for example the component 42*b*, may carry an erase core, having a surface that is contoured like the slotted surface 78, but containing a single transverse gap. Such a core may be selectively energized whenever its surface is in contact with the tape. With a tape having a thickness of less than 2 mils, such simultaneous bulk erasing of all tape channels can be carried out from the tape surface opposite to that which is presented to the magnetic head 10.

From the foregoing disclosure it will be apparent that the present invention provides a tape transport wherein the vacuum brake has a pair of contoured surfaces which normally hold the tape in contact with a fixed magnetic head, but which may be selectively moved out of contact with the latter to provide access for cleaning and maintenance purposes. In the latter position of the brake, which may be suitably indicated by an indicator light or the like, tape threading and withdrawal, as well as rapid rewinding are facilitated. With the magnetic head itself remaining fixed, the relationship between the respective cores and tape channels is not disturbed and only the spacing between the tape and the head is varied. A relatively simple and inexpensive tape transport is thus provided, wherein close tolerances are readily maintained between a multi-core magnetic head and a corresponding multi-channel magnetic tape, so as to avoid cross-talk between respective channels.

The implementation of the inventive concepts disclosed herein is, of course, subject to various modifications and departures. For example, in both of the illustrated embodiments the relationship of the biasing means and of the force applying means may be reversed with respect to each other. Similarly, the application of force in the embodiments of FIGURES 2 and 3 may be carried out in various and different ways. If desired, the force applying means may be mechanized to respond automatically to a commond signal. Various ways of guiding the linear motion of the brake, representing departures from the arrangement in FIGURE 2, may also be implemented. Such implementations are applicable in modified form to the embodiment of FIGURE 3 wherein the brake components 42*a* and 42*b* move in a circular path about the pivot points 90 and 92 respectively. Similarly, the use of an erase gap in one of the pair of contoured surfaces is applicable to the embodiments of FIGURE 2 as well as of FIGURE 3. The signal S may obviously be used to energize an indicator light or to provide some other suitable indication. It will also be clear that the invention is applicable to unidirectional tape transports, as well as to transports wherein means other than those disclosed herein, e.g., pinch rollers, are employed to hold the tape against the drive capstans.

From the foregoing explanation, it will be apparent that numerous modifications, changes and equivalents will now occur to those skilled in the art, all of which fall within the true spirit and scope contemplated by the invention.

What is claimed is:

1. In a tape transport wherein magnetic tape is moved between a pair of spaced capstans, a stationary magnetic head positioned to one side of said tape between said capstans and including an arcuate surface adapted to be presented to said tape, a brake positioned on the other side of said tape confronting said head, said brake including a pair of contoured surfaces adapted to be contacted by said tape, said surfaces being symmetrically positioned with respect to said head to define a space therebetween opposite said head, a plurality of suction slots disposed in said pair of surfaces, means for selectively applying a vacuum to said brake to arrest the motion of said tape by drawing it against said pair of surfaces, means permitting movement of said contoured pair of brake surfaces relative to said head to vary the spacing therebetween in a direction substantially normal to the direction of tape motion, means urging said spaced brake surfaces toward said head to receive a portion of said arcuate head surface therebetween together with the interposed tape, and means for selectively withdrawing said brake surfaces from said head to move said tape out of contact with the latter.

2. The apparatus of claim 1 and further including means responsive to the withdrawn position of said brake surfaces to provide an indication thereof.

3. In a tape transport, a stationary magnetic transducer head having an arcuate surface adapted to be presented to a magnetic tape, a pair of rotatable capstans symmetrically positioned with respect to said head and being adapted to move said tape therebetween, a brake positioned between said capstans and movably disposed with respect to said capstans opposite said head to vary the spacing between said brake and said head said brake including a pair of contoured surfaces symmetrically disposed with respect to said head to define a space therebetween opposite said head, said surfaces defining the path of said tape wrapped around a portion of said arcuate head surface in one position of said brake and out of contact with said head surface in another position of said brake, at least one of said contoured surfaces including a plurality of suction slots, and means for selectively applying a vacuum to said tape through said suction slots.

4. The apparatus of claim 3 wherein said brake further includes an erase core movable with said brake, said erase core terminating in the other one of said contoured surfaces and including an erase gap transversely spanning said tape, and means for selectively energizing said erase core in said one brake position.

5. In a tape transport, a stationary magnetic transducer head having an arcuate surface adapted to be presented to a magnetic tape, a pair of rotatable capstans symmetrically positioned on a supporting structure below said head and on opposite sides thereof and adapted to move said tape therebetween, a brake positioned between said capstans and below said head and including a pair of symmetrically spaced, contoured surfaces, said brake further including a pair of symmetrically spaced slots elongated in a direction substantially normal to the plane of said tape, a pair of pins fixed with respect to said supporting structure and slidably extending through said pair of slots, a pair of compression springs urging said brake upward toward said head, said pins and slots cooperating to define the extreme positions of said brake relative to said head, said spaced contoured brake surfaces defining the path of said tape in a manner wrapped around a portion of said arcuate head surface in the extreme upward brake position and out of contact with said head surface in the extreme downward brake position, said brake including a third slot centrally located between said pair of spaced slots and elongated in a direction substantially parallel to said tape, a rotatable disc eccentrically pivoted on said supporting structure and slidably positioned in said third slot, a knob affixed to said disc and adapted to turn the latter so as to selectively move said brake between its extreme positions relative to said head, a plurality of suction slots disposed in said contoured brake surfaces, and means for selectively applying a vacuum to said tape through said suction slots to arrest the movement of said tape.

6. In a tape transport, a stationary magnetic transducer head having an arcuate surface adapted to be presented to a magnetic tape, a pair of rotatable capstans symmetrically positioned on a supporting structure with respect to said head and being adapted to move said tape therebetween, a brake positioned between said capstans and confronting said head, said brake including a pair of substantially identical elongated components each pivotably mounted at one end on said supporting structure in crossed-over relationship with the other brake component, the other end of each of said brake components terminating in a contoured surface disposed opposite said arcuate head surface and spaced from the contoured surface of the other brake component, said contoured surfaces containing slots, means, operative at the crossover point of said brake components for selectively moving said spaced contoured surfaces toward said head to receive a portion of said arcurate head surface therebetween together with the interposed tape, means coupled to said supporting structure for resiliently urging said contoured surfaces away from said head to move said tape out of contact with said head surface, and means for selectively applying a vacuum to said tape through said slots in said contoured surfaces to arrest tape travel.

7. The apparatus of claim 6 and further comprising means including a limit switch responsive to the extreme downward brake position to provide an indication thereof.

References Cited

UNITED STATES PATENTS

| | | | |
|---|---|---|---|
| 2,481,392 | 9/1949 | Camras | 179—100.2 X |
| 2,526,358 | 10/1950 | Howell | 179—100.2 |
| 2,784,259 | 3/1957 | Camras | 179—100.2 X |
| 2,864,621 | 12/1958 | Stavrakis et al. | 179—100.2 X |
| 2,866,637 | 12/1958 | Pendleton | 340—174.1 X |
| 2,954,911 | 10/1960 | Baumeister et al. | 226—95 |
| 3,024,319 | 3/1962 | Roberts et al. | 179—100.2 |
| 3,050,225 | 8/1962 | Ulman | 179—100.2 X |
| 3,189,291 | 6/1965 | Welsh | 179—100.2 X |
| 3,251,048 | 5/1966 | Killen | 179—100.2 X |

BERNARD KONICK, *Primary Examiner.*

L. G. KURLAND, A. I. NEUSTADT, *Assistant Examiners.*